(12) United States Patent
Klode et al.

(10) Patent No.: US 9,611,923 B2
(45) Date of Patent: Apr. 4, 2017

(54) BALLSCREW ASSEMBLY

(71) Applicant: Goodrich Corporation, Charlotte, NC (US)

(72) Inventors: Harald Klode, Centerville, OH (US); David Bernard Drennen, Bellbrook, OH (US)

(73) Assignee: Goodrich Corporation, Charlotte, NC (US)

(*) Notice: Subject to any disclaimer, the term of this patent is extended or adjusted under 35 U.S.C. 154(b) by 619 days.

(21) Appl. No.: 13/777,026

(22) Filed: Feb. 26, 2013

(65) Prior Publication Data

US 2013/0186224 A1 Jul. 25, 2013

Related U.S. Application Data

(62) Division of application No. 13/008,631, filed on Jan. 18, 2011, now Pat. No. 8,402,852.

(51) Int. Cl.
*F16H 25/20* (2006.01)
*F16H 25/22* (2006.01)
(Continued)

(52) U.S. Cl.
CPC ......... *F16H 25/2214* (2013.01); *F16D 65/16* (2013.01); *F16H 25/2204* (2013.01);
(Continued)

(58) Field of Classification Search
CPC ............. F16H 25/20; F16H 2025/2031; F16H 2025/2037; F16H 25/2204
(Continued)

(56) References Cited

U.S. PATENT DOCUMENTS

| 1,027,542 A | 5/1912 | Hess |
| 1,375,313 A * | 4/1921 | Ohlsson ................. F16C 19/08 144/251.3 |

(Continued)

FOREIGN PATENT DOCUMENTS

| EP | 1312831 | 5/2003 |
| WO | 01/71217 | 9/2001 |

OTHER PUBLICATIONS

Official Action dated Apr. 24, 2012 in European Application No. 11250842.9.

(Continued)

*Primary Examiner* — William C Joyce
(74) *Attorney, Agent, or Firm* — Snell & Wilmer L.L.P.

(57) ABSTRACT

A ballscrew assembly may comprise a ballscrew having an axially distributed ballscrew groove about an interior circumference of the ballscrew, an extended top plate having an axially distributed extended top plate groove disposed on an outer circumference of the extended top plate, and an axially distributed thrust bearing. Further, a ballnut assembly may comprise a ballnut having an axially distributed ballnut groove about an interior circumference of the ballnut, an extended top plate having an axially distributed extended top plate groove disposed on an outer circumference of the extended top plate, and an axially distributed thrust bearing. Further still, a ballnut assembly may comprise a ballnut having an axially distributed ballnut groove about an outer circumference of the ballnut, an extended top plate having an axially distributed extended top plate groove disposed on an interior circumference of the extended top plate and an axially distributed thrust bearing.

7 Claims, 7 Drawing Sheets

(51) Int. Cl.
*F16D 65/16* (2006.01)
*F16D 121/14* (2012.01)
*F16D 125/40* (2012.01)

(52) U.S. Cl.
CPC ...... *F16D 2121/14* (2013.01); *F16D 2125/40* (2013.01); *Y10T 29/49464* (2015.01); *Y10T 74/18576* (2015.01); *Y10T 74/19749* (2015.01)

(58) Field of Classification Search
USPC ................................ 74/89.23; 384/504, 508
See application file for complete search history.

(56) References Cited

U.S. PATENT DOCUMENTS

| | | | |
|---|---|---|---|
| 3,029,659 | A | 4/1962 | Geyer |
| 6,164,707 | A | 12/2000 | Ungchusri et al. |
| 6,389,915 | B1 | 5/2002 | Wingett |
| 6,691,837 | B1 * | 2/2004 | Kapaan ................ F16D 65/18 188/156 |
| 6,814,190 | B1 | 11/2004 | Olschewski et al. |
| 7,062,987 | B2 * | 6/2006 | Yoshida .............. F16C 33/3706 192/94 |
| 2010/0275710 | A1 | 11/2010 | Wingett et al. |

OTHER PUBLICATIONS

European Search report dated Aug. 1, 2012 in Application No. 11250842.9.
Non-Final Office Action dated Feb. 27, 2012 in Application No. 13/008,631.
Final Office Action dated Jul. 12, 2012 in U.S. Appl. No. 13/008,631.
Final Office Action dated Aug. 23, 2013 in U.S. Appl. No. 13/008,631.
Notice of Allowance dated Jan. 22, 2013 in U.S. Appl. No. 13/008,631.
Notice of Allowance dated Dec. 10, 2012 in U.S. Appl. No. 13/008,631.

* cited by examiner

BALLSCREW ASSEMBLY

CROSS REFERENCE TO RELATED APPLICATIONS

This application is a divisional of and claims priority to U.S. patent application Ser. No. 13/008,631, filed Jan. 18, 2011 and entitled "BALLSCREW ASSEMBLY." The '631 application is incorporated herein by reference.

FIELD

The present disclosure is related to a ballscrew assembly for use in an aircraft brake, for example.

BACKGROUND

Aircraft brakes often include a ballscrew. A ballscrew typically converts rotational motion into translating motion by driving a translating ballnut. In an aircraft brake, the ballnut may (either directly or through other components) drive a brake stack into frictional engagement. As is described herein, conventional ballscrew assemblies may comprise a ballscrew and a top plate, wherein one or more rolling element bearings (e.g., balls or rollers) are in contact with the ballscrew and top plate. A conventional ballscrew assembly may also comprise a preloading rolling element bearing, such as a preload ball bearing. These conventional configurations add axial length to the ballscrew assembly, which is typically disfavored. Thus, a need exists for an improved ballscrew assembly that reduces the axial length of a ballscrew assembly.

SUMMARY

Systems and methods disclosed herein may be useful for use in a ballscrew assembly. In this regard, a ballscrew assembly is provided in various embodiments comprising a ballscrew having an axially distributed ballscrew groove about an interior circumference of the ballscrew. The ballscrew assembly further comprises an extended top plate having an extension portion extending in an axial direction and having an axially distributed extended top plate groove disposed on an outer circumference of the extended top plate, the extended top plate having an outer diameter less than the interior diameter of the ballscrew. An axially distributed thrust bearing is disposed in a space bounded by the axially distributed ballscrew groove and the axially distributed extended top plate groove.

In various embodiments, a ballnut assembly is disclosed comprising a ballnut having an axially distributed ballnut groove about an interior circumference of the ballnut. The ballnut assembly further comprises an extended top plate having an extension portion extending in an axial direction and having an axially distributed extended top plate groove disposed on an outer circumference of the extended top plate, the extended top plate having an outer diameter less than the interior diameter of the ballnut. An axially distributed thrust bearing is disposed in a space bounded by the axially distributed ballnut groove and the axially distributed extended top plate groove.

In various embodiments, a ballnut assembly is also disclosed comprising a ballnut having an axially distributed ballnut groove about an outer circumference of the ballnut. The ballnut assembly further comprises an extended top plate having an extension portion extending in an axial direction and having an axially distributed extended top plate groove disposed on an interior circumference of the extended top plate, the extended top plate having an outer diameter greater than the interior diameter of the ballnut. An axially distributed thrust bearing is disposed in a space bounded by the axially distributed ballnut groove and the axially distributed extended top plate groove.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for ballscrew assemblies. Although the embodiments herein are described with reference to ballscrew assemblies used in connection with aircraft brakes, such embodiments are provided for example only as it is contemplated that the disclosures herein have applicability to other vehicles, such as automobiles.

Figures 1A, 1B:
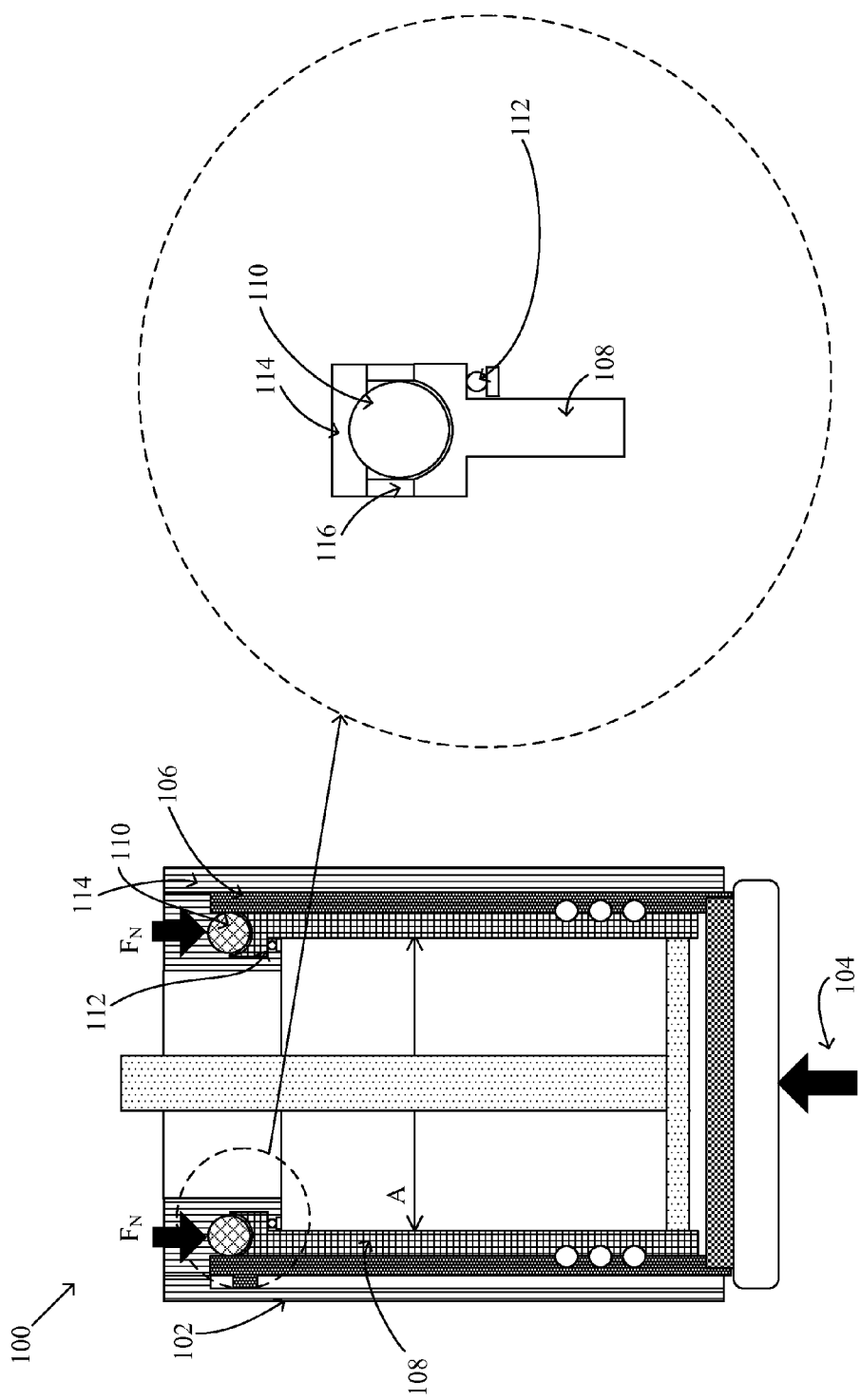
FIG. 1A-1B illustrate a prior art ballscrew assembly.

Conventional ballscrew assembly 100 is shown in FIGS. 1A-1B. With reference to FIGS. 1A-1B, ballscrew 108 and ballnut 106 are shown in a cut away fashion. Ballscrew 108's rotational motion may drive the translating of ballnut 106 in an aircraft brake actuator, for example. Ballscrew 108 is shown having a proximal surface adjacent to thrust bearing 110, allowing thrust bearing 110 to rotate against the proximal surface of ballscrew 108. Top plate 114 is shown having a distal surface adjacent to thrust bearing 110, allowing thrust bearing 110 to rotate against the distal surface of top plate 114. Thrust bearing retainer 116 is configured to laterally retain thrust bearing 110. Preload bearing 112 is shown subjacent to ballscrew 108. Preload bearing 112 preloads thrust bearing 110 so that thrust bearing 110 maintains contact with ballscrew 108 and top plate 114 when normal load 104 is not present. The preloading of thrust bearing 110 thus helps to prevent skidding and the brinneling that may result from such skidding. Normal loads 104 and 102 may load the ballscrew 108 and thus, load thrust bearing 110.

The conventional system shown in FIGS. 1A-1B, as in many conventional systems, adds unnecessary axial length to the ballscrew assembly, a feature that is typically disfavored. For example, the diameter of thrust bearing 110 separates ballscrew 108 from top plate 114. In addition, because only one row of thrust bearings are used, the thrust bearings are typically of a geometry that may accommodate the anticipated loads (e.g., cylindrically shaped instead of spherically shaped) and are typically of a large diameter. The use of a single row also results in load being distributed to a single portion of the ballscrew 108. In many conventional systems, as mentioned above, cylindrical rollers are selected to act as the thrust bearings due to a roller's ability to withstand higher loads than a ball bearing of equal diameter. However, rollers may increase friction and may be prone to poor performance. Thus, an improved ballscrew assembly that mitigates the problems of conventional systems is needed.

In various embodiments, a ballscrew assembly is provided having axially distributed grooves for rolling element bearings. The axial distribution of grooves allows for a shortened axial length relative to conventional systems. The use of multiple axially distributed grooves may allow loads to be spread across a greater number of rolling elements and may thus enable the use ball bearings in place of roller bearings. Likewise, the use of multiple axially distributed grooves may allow loads to be spread across a larger portion of the ballscrew. In addition, the axial distribution of grooves may allow a ballscrew assembly to bear side loads in addition to axial loads. Moreover, the axial distribution of grooves allows for the elimination of preloading rolling elements.

In various embodiments, a ballscrew assembly comprising a ballscrew having an axially distributed ballscrew groove about a circumference of the ballscrew; an extended top plate having an axially distributed extended top plate groove and an axially distributed thrust bearing disposed in a space bounded by the axially distributed ballscrew groove and the axially distributed extended top plate groove.

Figure 2:
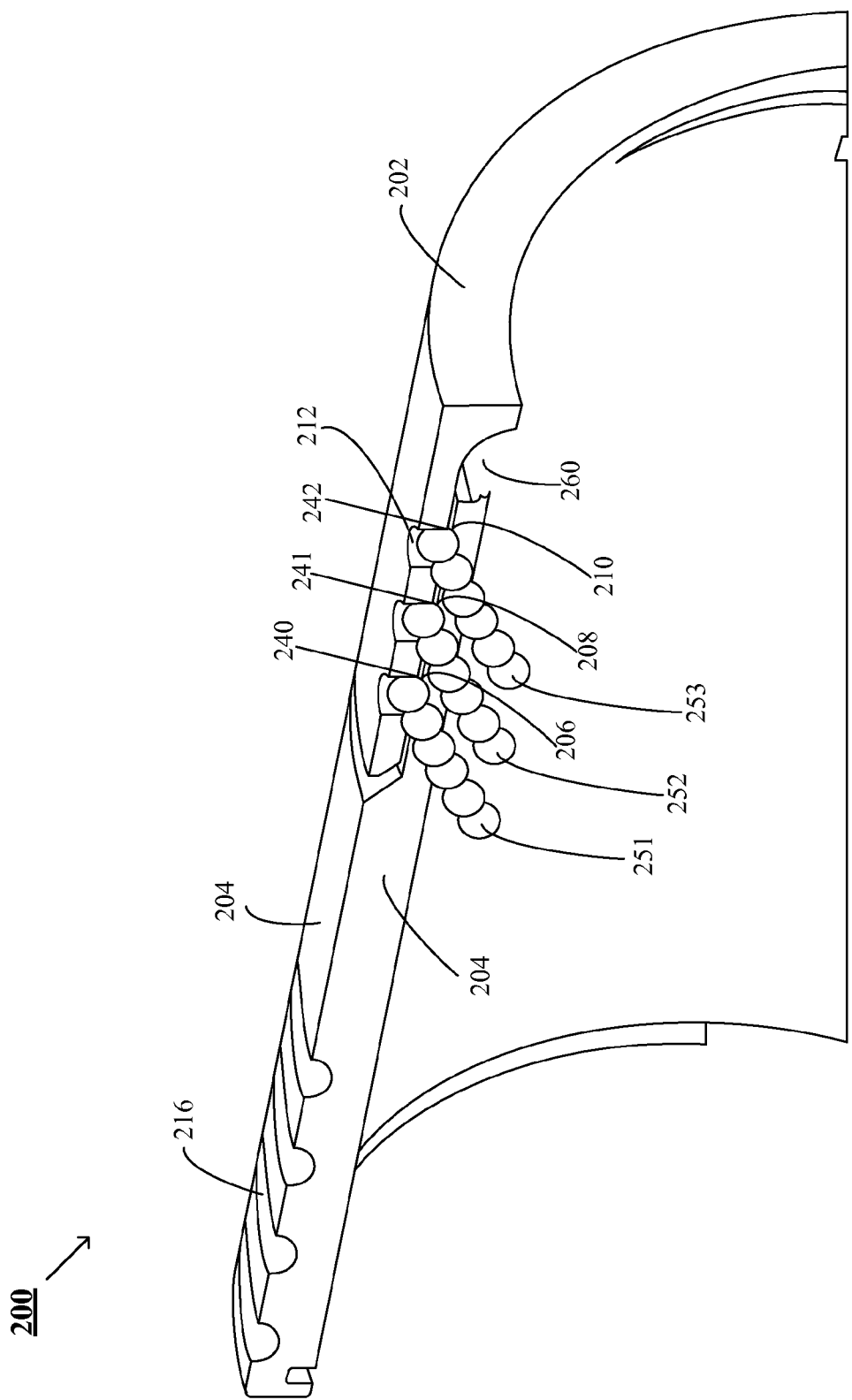
FIG. 2 illustrates a view of an exemplary ballscrew assembly in accordance with various aspects of an embodiment.

In accordance with various embodiments, and with reference to FIG. 2, ballscrew assembly 200 is shown. Ballscrew 204 is shown in a cut away view, as ballscrew 204 is substantially cylindrical or cylindrical, although other geometric configurations are contemplated herein. It should be understood that the substantially cylindrical or cylindrical ballscrew 204 has an axis running from the proximal end of ballscrew 204 to the distal end of ballscrew 204. In an embodiment, ballscrew 204 has threads 216 disposed on a proximal end of ballscrew 204. Threads 216 are intended for coupling with a ballnut and may have nonzero helix angles.

Ballscrew 204 may also comprise ballscrew axially distributed grooves 206, 208 and 210 disposed distal to threads 216. As shown, ballscrew axially distributed grooves 206, 208 and 210 are disposed on an outer circumferential surface of ballscrew 204. Extended top plate 202 comprises extended top plate axially distributed grooves 240, 241 and 242. Extended top plate 202 has an inner circumferential surface that is configured to be parallel or substantially parallel to the outer circumferential surface of the ballscrew. A shown, extended top plate axially distributed grooves 240, 241 and 242 are disposed on the inner circumferential surface of extended top plate 202.

Ballscrew axially distributed grooves 206, 208 and 210 and extended top plate axially distributed grooves 240, 241 and 242 may be aligned with one another, as shown, so that each couplet of ballscrew axially distributed groove and extended top plate axially distributed groove define a volume or space which may be referred to as an axially distributed groove space, an axially distributed groove volume, or a thrust bearing space. Thus, FIG. 2 shows three axially distributed groove spaces along the axis of ballscrew 204. The spacing of the axially distributed groove spaces may be selected using a variety of methods. In various embodiments, the axially distributed groove spaces are disposed at least one thrust bearing diameter away from one another. Such configuration allows for ease of construction, as described herein, and improves load handling performance. However, in various embodiments, the axially distributed groove spaces may be spaced less than one thrust bearing diameter away from one another.

Though any rolling element bearing may be used as a thrust bearing, balls 251, 252 and 253 are shown disposed in axially distributed groove spaces. Accordingly, balls 251, 252 and 253 act as axially distributed thrust bearings. In various embodiments, rolling element bearings that are not balls could be used in place of balls 251, 252 and 253.

With continued reference to FIG. 2, balls 251, 252 and 253 may rotate within the axially distributed groove spaces while in contact with either ballscrew 204, extended top plate 202, or both. In various embodiments, balls 251, 252 and 253 would be sized so that each ball would maintain contact with both ballscrew 204 and extended top plate 202. Each axially distributed groove space may accommodate any number of balls, limited only by the total volume of the axially distributed groove space. Ball number and ball size may be selected depending upon a variety of factors, including the number of axially distributed groove spaces per ballscrew assembly and the anticipated load amount, among other considerations. The balls may be distributed over one or more axially distributed spaces. Thus, where a large number of smaller balls are used, it may be advantageous to increase the number of axially distributed spaces, which further distributes load across a ballscrew. This is an improvement over conventional systems where load is typically distributed to only a single portion of the ballscrew.

Although the number of balls used may be selected using a variety of techniques, an exemplary technique is to select ball number by using the square of the diameter ratio between a larger ball diameter and a smaller ball diameter. For example, it may be determined that a single row of 25 balls, each of diameter 6 mm, are suitable to be used in a given ballscrew assembly. If balls of 3 mm diameter are desired, then the total number of balls would be the ratio of larger ball diameter to smaller ball diameter squared, or, in this example, $(6 \text{ mm}/3 \text{ mm})^2$ which results in 4. Thus, 4 times the original number of balls would be used, or in this example, 100 balls. The 100 balls may be distributed across multiple axially distributed groove spaces, for example, 4 axially distributed groove spaces may be used, each having 25 balls having a diameter of 3 mm, in like manner, the number of axially distributed groove spaces in a ballscrew assembly may selected based upon a variety of factors, such as ball number and ball size.

Gap 260 is present between a distal surface of ballscrew 204 and a proximal surface of extended top plate 202. As the reduction of axial length is typically preferred, gap 260 may be made to be of minimal length. In various embodiments, gap 260 is from about 0.1 mm to 10 mm in length, preferably from about 0.5 mm to about 5 mm, and, in various embodiments, gap 260 is 1 mm. If the distal surface of ballscrew 204 and the proximal surface of extended top plate 202 were in contact, gap 260 would not be present. In such embodiments, however, such contact would produce friction upon rotation of ballscrew 204, which would be suboptimal. In various embodiments, gap 260 may remain constant or substantially constant. The axial distribution of the balls, along with proper ball size selection, allows the balls to maintain gap 260 constant or substantially constant in the absence of a load (e.g., when only the force of gravity acts upon the ballscrew assembly). Thus, the balls act to preload the ballscrew 204 and extended top plate 202, eliminating the need for separate preloading rolling elements, thereby reducing design complexity and weight.

Upon application of a load in an axial direction, balls 251, 252 and 253 may transfer the load to and/or from the extended top plate 202 to the ballscrew 204. Load may typically be transferred across the diameter of each ball in a substantially diagonal manner, for example, at a forty five degree angle. Ballscrew 204 may be allowed to rotate under this load, thus rotating balls 251, 252 and 253.

Ballscrew 204 and extended top plate 202 may be constructed of any suitable material. In various embodiments, a hard material is used so that neither ballscrew 204 nor extended top plate 202 deform under the anticipated loads. For example, in various embodiments, ballscrew 204 and extended top plate 202 may comprise steel (e.g., hardened steel). Similarly, any rolling element (e.g., ball bearings) may be comprised of any suitable material, including hard materials such as steel (e.g., hardened steel) or silicon nitride.

Ballscrew axially distributed grooves 206, 208 and 210 may be disposed in ballscrew 204 in any suitable manner. For example, ballscrew axially distributed grooves 206, 208 and 210 may be formed by milling, machining, casting, grinding, forging, and other suitable methods. Ballscrew axially distributed grooves 206, 208 and 210 may be sized in accordance with the size of the rolling elements (e.g., ball bearings) that are anticipated for use with ballscrew axially distributed grooves 206, 208 and 210. Ballscrew axially distributed grooves 206, 208 and 210 may be selected to reduce or eliminate any translational motion that may result upon rotation. Thus, in various embodiments, ballscrew axially distributed grooves 206, 208 and 210 have helix angles of zero or about zero degrees.

Likewise, extended top plate axially distributed grooves 240, 241 and 242 may be disposed in extended top plate 202 in any suitable manner. For example, extended top plate axially distributed grooves 240, 241 and 242 may be formed by milling, machining, casting, grinding, forging, and other suitable methods. Extended top plate axially distributed grooves 240, 241 and 242 may be sized in accordance with the size of the rolling elements (e.g. ball bearings) that are anticipated for use with extended top plate axially distributed grooves 240, 241 and 242. Extended top plate axially distributed grooves 240, 241 and 242 may be selected to reduce or eliminate any translational motion that may result upon rotation. Thus, in various embodiments, extended top plate axially distributed grooves 240, 241 and 242 have helix angles of zero or about zero degrees.

Extended top plate axially distributed grooves 240, 241 and 242 may also have one or more apertures, such as aperture 212. Aperture 212 may be sized so that it may allow a rolling element to pass through it. Thus, aperture 212 may be sized to be greater than the diameter of balls 251, 252 and 253. In this manner, extended top plate 202 and ballscrew 204 may be coupled. Then, during or concurrent with coupling, rolling elements such as balls may be passed through aperture 212 so that each ball enters an axially distributed space.

In various embodiments, an extended top plate may have a diameter that is less than that of a ballscrew. In this manner, an extended top plate may contain a cylindrical or substantially cylindrical exterior surface that may be positioned within an interior of the ballscrew. In various embodiments, ballscrew axially distributed grooves may be positioned on an interior surface of the ballscrew and extended top plate axially distributed grooves may be positioned on an exterior surface of the extended top plate. The extended top plate axially distributed grooves and ballscrew axially distributed grooves form an axially distributed groove space into which balls may be inserted through apertures in the extended top plate.

Figure 3:
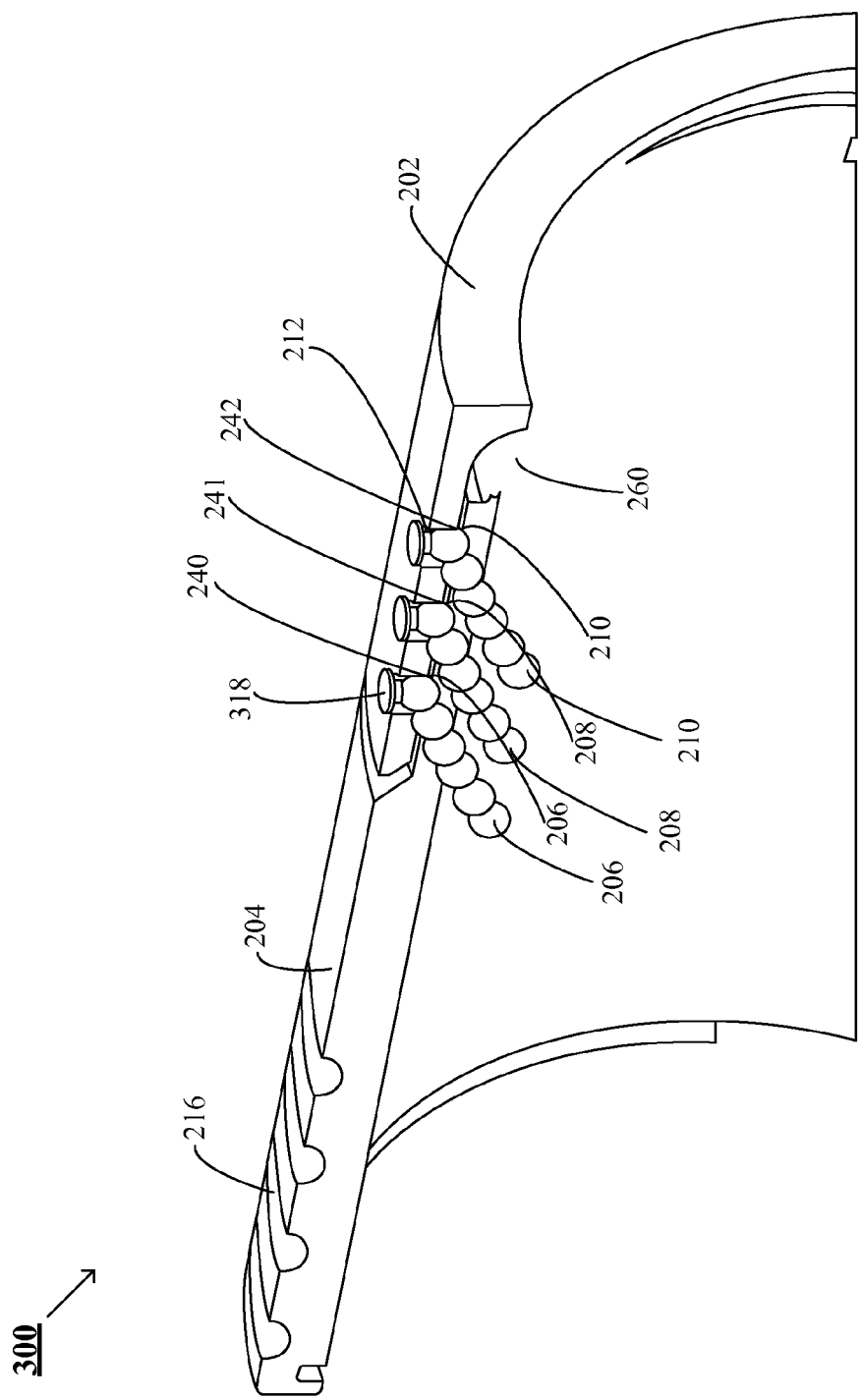
FIG. 3 illustrates a view of the ballscrew assembly of FIG. 2 having filled apertures.

With reference to FIG. 3, in an embodiment, aperture 212 may be partially or fully filled with plug 318, such that the plug retains the ball. Plug 318 may be sized to seal aperture 212 and provided a raised, flush, or substantially flush surface on extended top plate 202. Plug 318 is shaped so that the portion of plug 318 that faces the axially distributed groove space provides a surface that is substantially continuous with the axially distributed extended top plate groove. In this manner, a rolling element (such as a ball) that is rolling within the axially distributed groove space is not disturbed or otherwise negatively affected by plug 318. For example, plug 318 may be curved or contoured to form a substantially flush surface with the axially distributed extended top plate groove when plug 318 is disposed within aperture 212. While a flush or substantially flush surface with the axially distributed extended top plate groove is preferred, other configurations that allow a rolling element to roll substantially undisturbed within the axially distributed groove space are contemplated herein.

Plug 318 may be fit into aperture 212 so that plug 318 is resistant to dislodgement. For example, plug 318 may be press fit or interference fit. In various embodiments a binding substance may be used, though use of such a binding substance may add extra weight to the ballscrew assembly. In various embodiments, plug 318 is interference fit into aperture 212. An interference fit may be achieved where plug 318 has a different coefficient of thermal expansion than the extended top plate 202. Plug 318 may be sized to be of a slightly larger diameter than aperture 212 and then reduced in temperature so that the diameter of plug 318 is reduced below that of aperture 212. Plug 318 may then be placed in aperture 212 and allowed to cool. In other embodiments, plug 318 is press fit (e.g., by use of three) into aperture 312.

Figure 4:
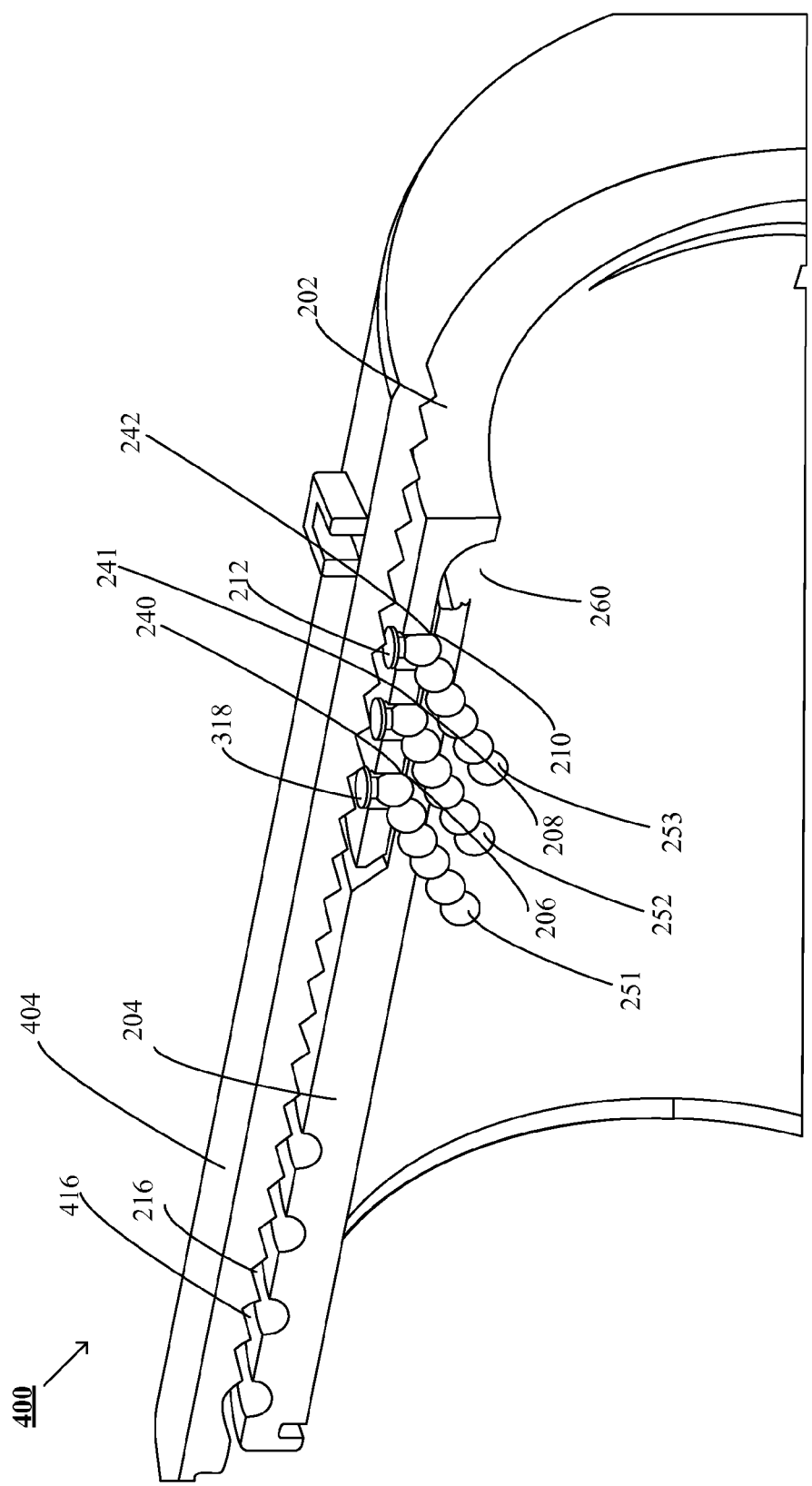
FIG. 4 illustrates a view of the ballscrew assembly of FIG. 3 having a ballnut.

With reference to FIG. 4, in an embodiment, ballscrew assembly 400 is shown having ballnut 404. Ballnut 404 has ballnut grooves 416 that mate to ballscrew threads 216. Rotational motion of ballscrew 204 thus drives translational motion of ballnut 404 via the operation of ballnut grooves 416 and ballscrew threads 216.

Figure 5:
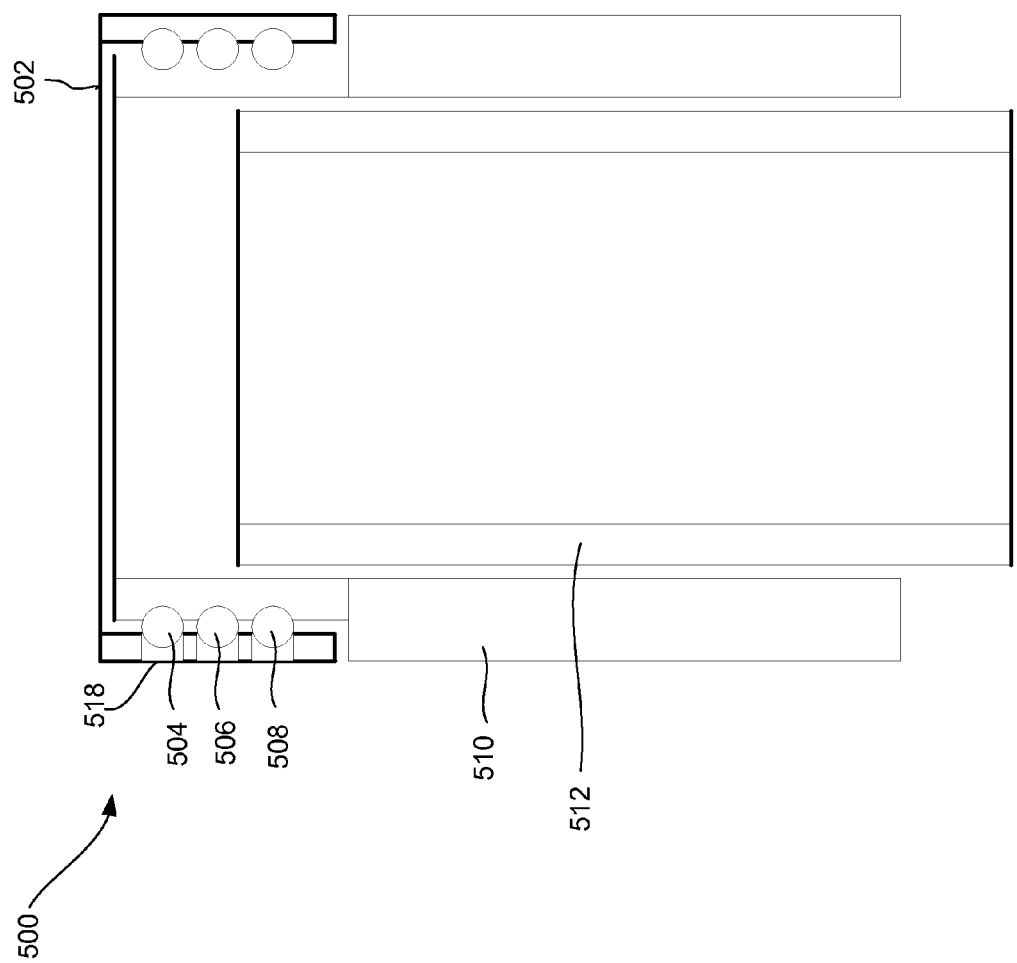
FIG. 5 illustrates a view of the ballscrew assembly having a translating ballscrew.

In various embodiments, a ballscrew may translate in response to rotation by a ballnut. Such an embodiment is illustrated in FIG. 5 as ballscrew assembly 500. With reference to FIG. 5, ballnut 510 comprises threads that are configured to engage threads on ballscrew 512. When the threads of ballnut 510 and ballscrew 512 are engaged, rotation of ballnut 510 would cause translation of ballscrew 512. Extended top plate 502 has an inner diameter larger than the outer diameters of both ballscrew 512 and ballnut 510. Extended top plate 502 has an inner circumferential surface that is configured to be parallel or substantially parallel to the outer circumferential surface of ballnut 510. In a manner similar to other embodiments described herein, ballnut 510 has ballnut axially distributed grooves disposed on an outer circumferential surface. Extended top plate 502 has extended top plate axially distributed grooves on an inner circumferential surface.

Ballnut axially distributed grooves and extended top plate axially distributed grooves define an axially distributed space where balls 504, 506 and 508 are disposed. Each axially distributed space in ballscrew assembly 500 has a helix angle of about zero degrees. Balls 504, 506 and 508 may be inserted into the axially distributed space through apertures in the outer surface of the extended top plate 502. For example, ball 504 may be inserted into an axially distributed space through aperture 518. Aperture 518 may then be filled in any manner described herein. For example, a plug may at least partially cover aperture 518. Preferably, in aperture 518 is filled with a plug that provides a continuous or substantially continuous surface with the extended top plate axially distributed groove.

Figure 6:
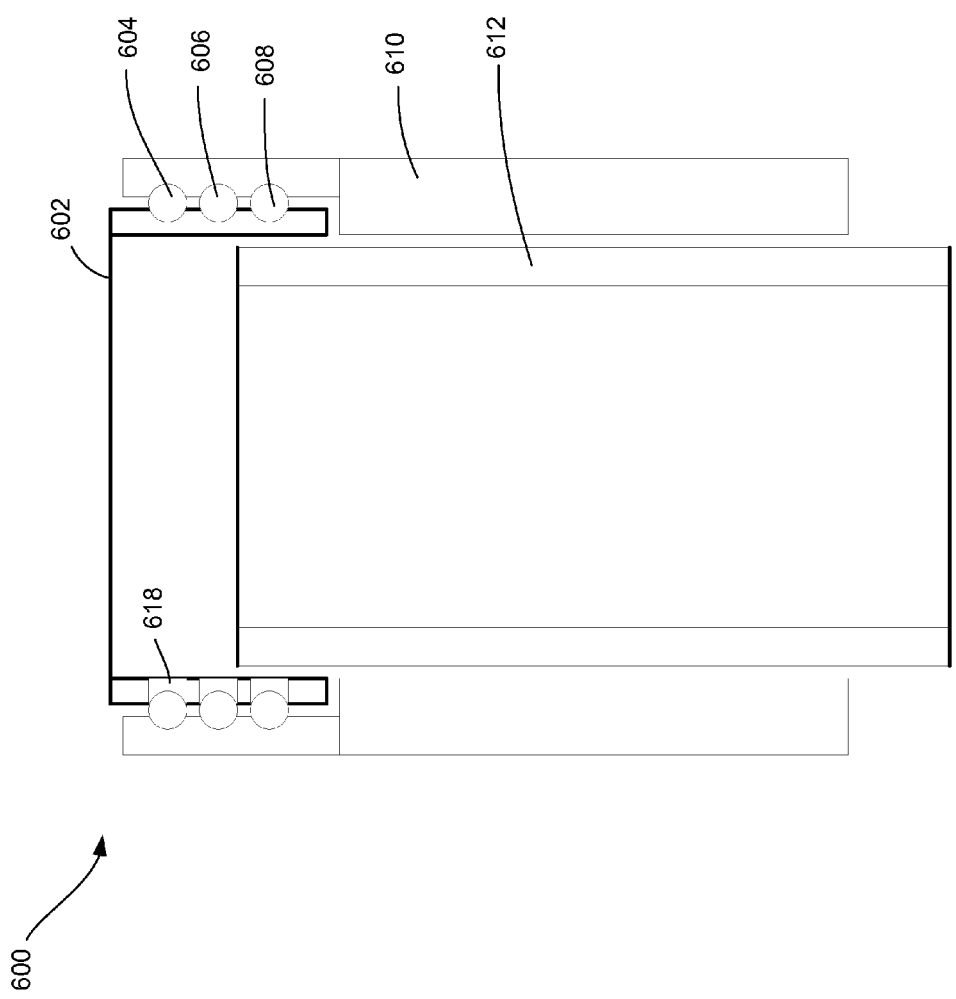
FIG. 6 illustrates a view of the ballscrew assembly hawing a translating ballscrew.

In various embodiments, rolling elements may be inserted into an axially distributed space through apertures disposed on the inside of an extended top plate. Such an embodiment is illustrated in FIG. 6 as ballscrew assembly 600. With reference to FIG. 6, ballnut 610 comprises threads that are configured to engage threads on ballscrew 612. When the threads of ballnut 610 and ballscrew 612 are engaged, rotation of ballnut 610 would cause translation of ballscrew 612. Extended top plate 602 has an outer diameter smaller than the inner diameter of ballnut 510. Extended top plate 602 has an outer circumferential surface that is configured to be parallel or substantially parallel to an inner circumferential surface of ballnut 610. In a manner similar to other embodiments described herein, ballnut 610 has ballnut axially distributed grooves disposed on an inner circumferential surface. Extended top plate 602 has extended top plate axially distributed grooves on an outer circumferential surface.

Ballnut axially distributed grooves and extended top plate axially distributed grooves define an axially distributed space where balls 604, 606 and 608 are disposed. Each axially distributed space in ballscrew assembly 600 has a helix angle of about zero degrees. Balls 604, 606 and 608 may be inserted into the axially distributed space through apertures in the inner surface of the extended top plate 602. For example, ball 604 may be inserted into an axially distributed space through aperture 618. Aperture 618 may then be filled in any manner described herein. For example, a plug may at least partially cover aperture 618. Preferably, in aperture 618 is filled with a plug that provides a continuous or substantially continuous surface with the extended top plate axially distributed groove.

Figure 7:
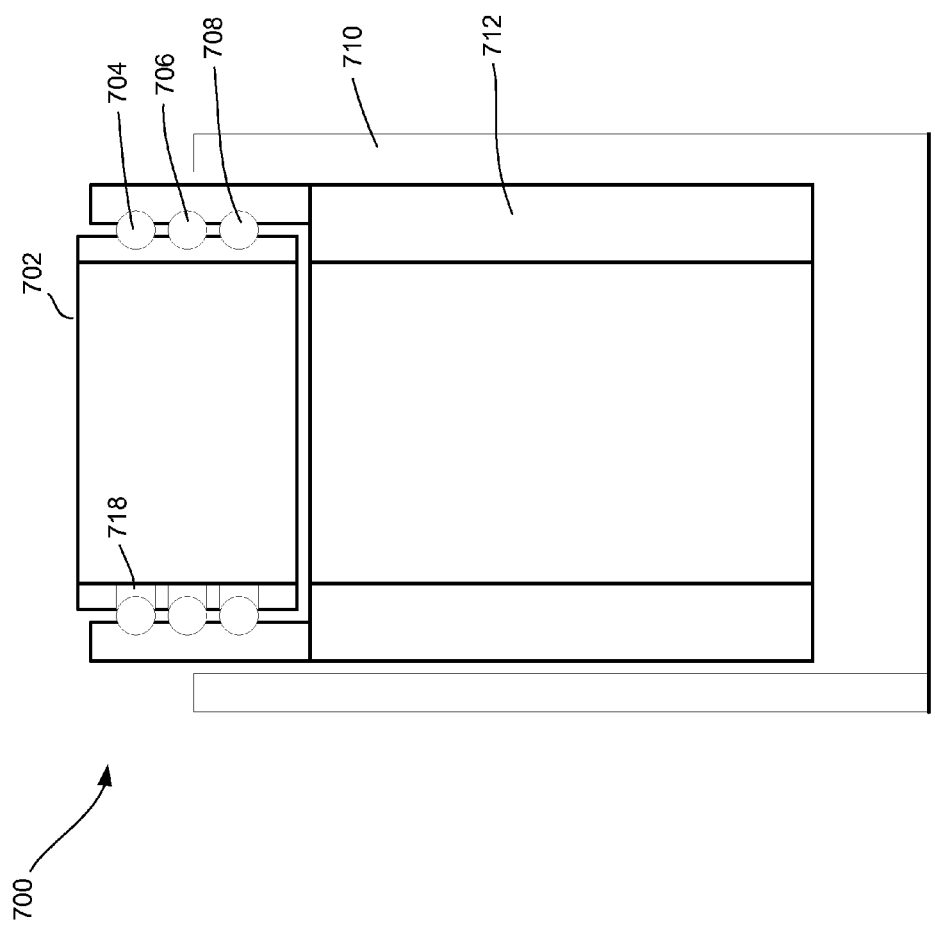
FIG. 7 illustrates a view of the ballscrew assembly where balls are loaded from inside the extended top plate.

Rolling elements may be inserted into an axially distributed space through apertures disposed on the inside of an extended top plate in embodiments where rotation of a ballscrew causes translation of a ballnut. Such an embodiment is illustrated in FIG. 7 as ballscrew assembly 700. With reference to FIG. 7, ballnut 710 comprises threads that are configured to engage threads on ballscrew 712. When the threads of ballnut 710 and ballscrew 712 are engaged, rotation of ballscrew 712 would cause translation of ballnut 710. Extended top plate 702 has an outer diameter smaller than the inner diameter of ballscrew 712. Extended top plate 702 has an outer circumferential surface that is configured to be parallel or substantially parallel to an inner circumferential surface of ballscrew 712. In a manner similar to other embodiments described herein, ballscrew 712 has ballscrew axially distributed grooves disposed on an inner circumferential surface. Extended top plate 702 has extended top plate axially distributed grooves on an outer circumferential surface.)

Ballscrew axially distributed grooves and extended top plate axially distributed grooves define an axially distributed space where balls 704, 706 and 708 are disposed. Each axially distributed space in ballscrew assembly 700 has a helix angle of about zero degrees. Balls 704, 706 and 708 may be inserted into the axially distributed space through apertures in the inner surface of the extended top plate 702. For example, ball 704 may be inserted into an axially distributed space through aperture 718. Aperture 718 may then be filled in any manner described herein. For example, a plug may at least partially cover aperture 718. Preferably, in aperture 718 is filled with a plug that provides a continuous or substantially continuous surface with the extended top plate axially distributed groove.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:
1. A ballscrew assembly comprising:
a ballscrew having an axially distributed ballscrew groove about an interior circumference of the ballscrew;
an extended top plate having an extension portion extending in an axial direction and having an axially distributed extended top plate groove disposed on an outer circumference of the extended top plate, the extended top plate having an outer diameter less than a first interior diameter of the ball screw; and
an axially distributed thrust bearing disposed in a space bounded by the axially distributed ballscrew groove and the axially distributed extended top plate groove;

wherein the axially distributed ballscrew groove has a helix angle of about zero degrees, wherein the ballscrew is configured to rotate with respect to the extended top plate, wherein the extended top plate is disposed entirely within an outer circumference of the ballscrew, and wherein an inner diameter of the extended top plate is substantially equal to a second inner diameter of the ball screw.

2. The ballscrew assembly of claim 1, wherein the axially distributed extended top plate groove comprises an aperture.

3. The ballscrew assembly of claim 2, wherein a plug is disposed in relation to the aperture for retention.

4. The ballscrew assembly of claim 1, wherein the ballscrew has a proximal surface and the extended top plate has a distal surface.

5. The ballscrew assembly of claim 1, wherein the ballscrew further comprises an axially distributed ballnut groove for receiving a ballnut.

6. The ballscrew assembly of claim 1, further comprising a ball disposed in the axially distributed ballscrew groove, wherein the ball is contained within the outer diameter of the ballscrew.

7. The ballscrew assembly of claim 1, wherein the axially distributed ballscrew groove is disposed radially outward of a distal portion of the ballscrew.

* * * * *